No. 787,027. PATENTED APR. 11, 1905.
M. VON DOLIVO-DOBROWOLSKY.
MONOPHASE AND POLYPHASE ALTERNATING CURRENT MACHINE.
APPLICATION FILED MAY 18, 1903.
2 SHEETS—SHEET 2.
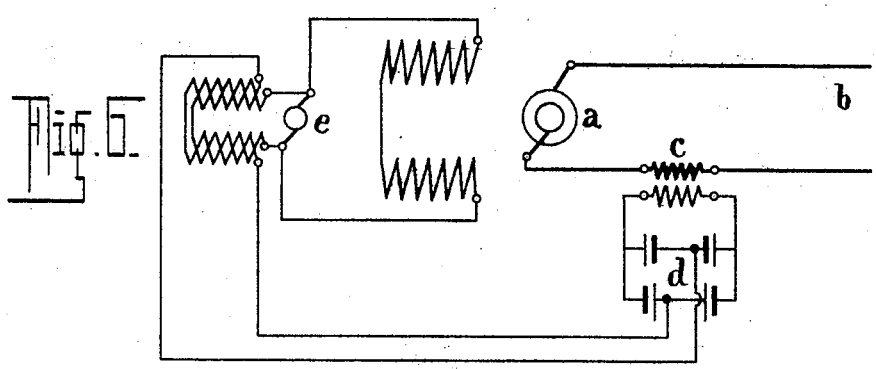
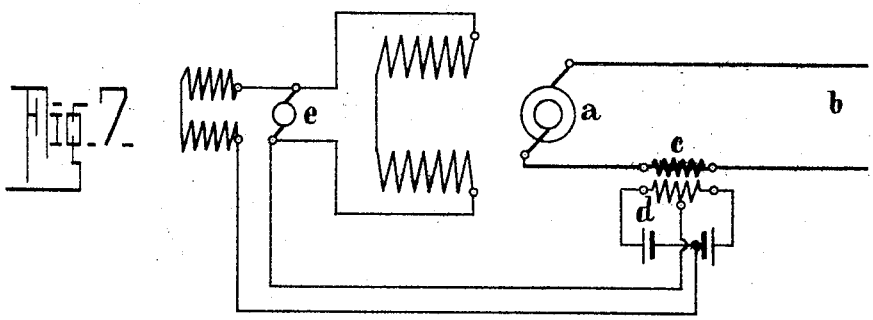
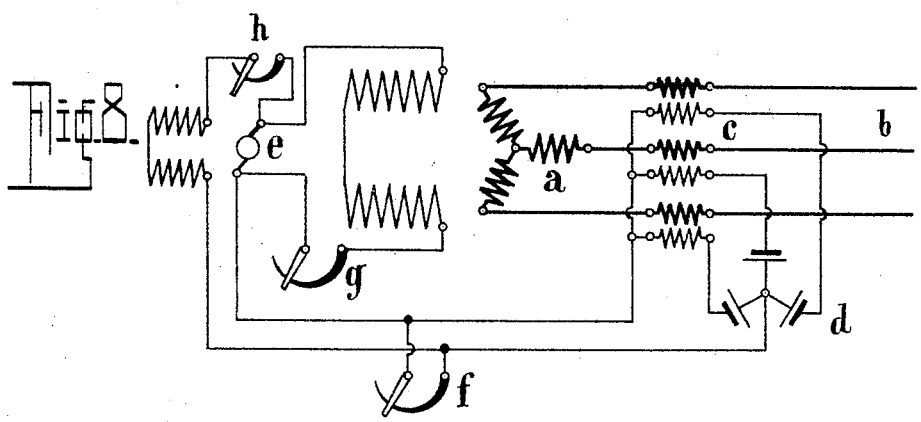
Witnesses—
Ellis Owen.
John Smith.
Inventor
M. von Dolivo-Dobrowolsky
by W. Evans
Attorney.

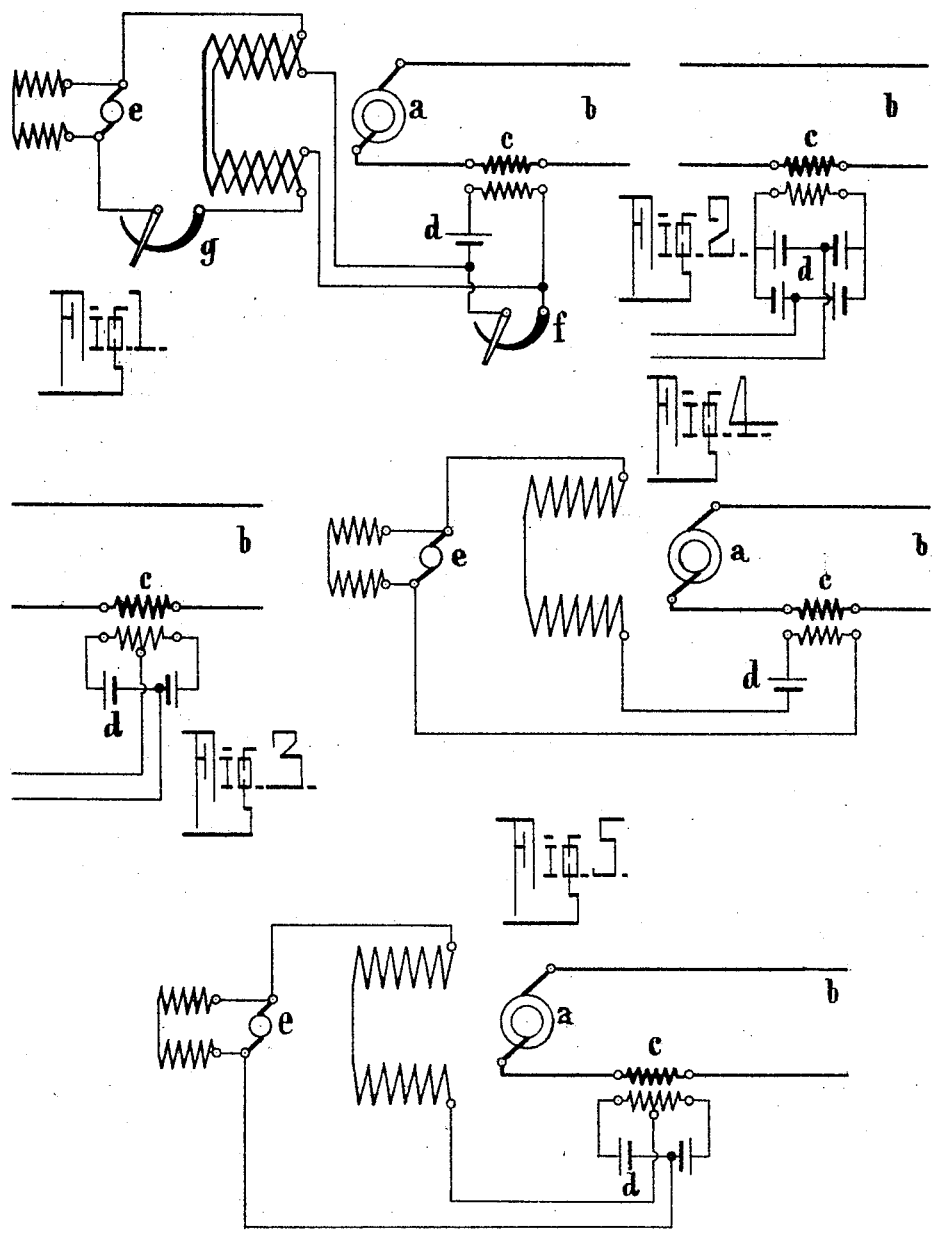

No. 787,027.

Patented April 11, 1905.

UNITED STATES PATENT OFFICE.

MICHAEL VON DOLIVO-DOBROWOLSKY, OF BERLIN, GERMANY.

MONOPHASE AND POLYPHASE ALTERNATING-CURRENT MACHINE.

SPECIFICATION forming part of Letters Patent No. 787,027, dated April 11, 1905.

Application filed May 18, 1903. Serial No. 157,627.

*To all whom it may concern:*

Be it known that I, MICHAEL VON DOLIVO-DOBROWOLSKY, a subject of the Russian Emperor, residing at Berlin, Prussia, German Empire, have invented certain new and useful Improvements Relating to Monophase and Polyphase Alternating-Current Machines, of which the following is a specification.

L. Maiche (German Patent No. 46,075) has already pointed out in the year 1887 how the peculiarity of polarization elements having an aluminium electrode (unipolar cells)—namely, that they allow only current impulses of a determined direction to pass through—may be utilized for the purpose of exciting an alternating-current machine by its own current. That method, however alluring it was, has practically never been used commercially. This may no doubt have been due in part to the uneconomical working of the unipolar cells. This drawback might be remedied by means of better-designed constructions of cells, as well in part by means of more favorable connections. Now the present invention specifies a mode of using the unipolar cells, in which the uneconomical working of the cells need scarcely be considered, for the reason that not the whole amount of excitation, but only a portion thereof, is supplied by the cells. If as a matter of course only the extra amount of excitation which is required by an alternating-current machine working under a load as compared with a machine not working under a load be taken from the unipolar cells, while the remainder of the excitation be taken in the usual manner from other sources of direct current, then it is clear that the low efficiency of the unipolar cell need hardly be taken into account. With this arrangement the important advantage is attained that the excitation of the machine varies automatically with the amount of the load similarly to the so-called "compound" machines with direct or continuous current.

I shall now proceed to describe more fully some modes of connection and arrangements which explain the invention hereinbefore referred to.

In Figure 1, $a$ represents an alternating-current machine which operates the mains $b$. In the main circuit of this machine a transformer $c$ is interposed. The secondary current of this transformer is led through a unipolar cell $d$ into one of the two magnet-windings of the alternating-current machine, while the other of these magnet-windings is fed by an ordinary exciter $e$. The question whether the dimensions of these two windings are equal or different depends, among other things, on the amount of the fall of potential in the alternating-current machine.

In the arrangement illustrated in Fig. 1, as well as in the following arrangements, the increase of excitation depends, however, only on the load increase in amperes and not on the extent of the displacement of the phases of the main current; but this drawback is practically of very little importance, as the so-called "cos." is mostly maintained for a long time at an approximately constant value. Slow variations of the same can occasionally be adjusted by means of the regulating devices $f$ and $g$, Fig. 1.

In Fig. 1 a unipolar cell is simply interposed, whereby only half the number of the alternating-current impulses are utilized, and in some measure it is left to the great impedance of the magnet-winding to expand this interruptedly-pulsating current into a constant continuous current. However, other modes of connecting the unipolar cells will frequently be employed with advantage and by means of which a greater uniformity is attained. Thus, for example, the known Graetz bridge connection of the cells, as illustrated in Fig. 2, or a somewhat simpler one, as illustrated in Fig. 3, or any other one may be employed. Furthermore, it is not at all necessary to interpose the regulating devices $f$ and $g$ in the manner illustrated in Fig. 2, as this is only one of the many numerous possible ways of adjusting at will the potential of the machine, as well as the degree of dependence of the same on the load. Thus the regulating device $f$, instead of being connected in parallel with the magnets, may also be connected in parallel with the secondary or even with the primary of the transformer, or it may also be connected in series with the magnet-winding, and so on. Instead of the regulating device $g$, or, in addition to this latter, a regulating resistance may be included in the magnet-winding of the exciter.

The above-described arrangement, Fig. 1, is, as already mentioned, in a certain respect somewhat similar to the arrangement of mixed excitation in continuous-current machines in so far as also in this case two magnet-windings are employed. This is, however, not at all necessary, because the additional exciter-circuit may be connected in series with the circuit of the exciter proper, as illustrated in Figs. 4 and 5, by way of example. In this case the result of placing more load on the main machine will be to cause a corresponding increase of the electromotive force in the circuit of the magnet, so that an automatic increase of the excitation takes place. No further explanation is required in order to understand that regulating devices may also be interposed here at suitable points. These two principal methods are suitable for every kind of excitation of an alternating-current machine, whether it be produced by an exciting-machine or by a transformer or whether the excitation be derived from continuous-current systems or accumulators and the like.

I shall now proceed to describe a particular modification of the present invention which is only suitable for use with certain exciter-machines. This is illustrated in Fig. 6. In this case the additonal exciter-current is not led around the magnets of the alternating-current machine, but around the magnets of the exciter. Obviously the same action is attained thereby, although in the case of sudden variations of load the magnetism may perhaps not follow on quite so quickly; but in such a case the advantage is obtained that the unipolar cells have to furnish very much less energy still than in the hereinbefore-mentioned examples and that therefore the comparatively low efficiency of these cells is of still less importance. In fact, assuming that the excitation of a one-thousand-kilowatt machine under full load be about 1.5 per cent., equal to fifteen kilowatts, then the exciter which would have to produce these fifteen kilowatts would require about seven per cent. of this for its own excitation, in round numbers equal to one kilowatt. The excitation between the condition of running without load and that of full load is assumed to vary, say, in the proportion of one to two—i. e., the excitation of the exciter without load is 0.5 kilowatt and with load one kilowatt. Then the unipolar cells have only to supply the amount of one kilowatt minus 0.5 kilowatt equal to 0.5 kilowatt; but as this amount of energy amounts to only one-twentieth of one per cent. of the output of the alternating-current machine it is evidently quite immaterial whether it is obtained with a high or low efficiency. Also in the manner of influencing the excitation of the energizer, as just described, a single magnet-winding may be employed instead of the two magnet-windings, if the additional exciter-circuit be connected in series with the circuit of the exciter proper, Fig. 7.

It is to be understood that as regards the nature of the invention it does not matter how this energizing-machine is constructed in other respects. It may be a shunt-machine or a main-current machine or an externally-energized machine, or it may be a transformer. Furthermore, several continuous-current machines may have a common exciter, and they may conjointly influence it, if this should seem advantageous for any reasons.

The invention is also not limited to monophase alternating-current generators; but it may just as well and even with more advantage be employed with polyphase machines. In the latter case the influencing of the excitation may be effected by one only of the mains or by a number or by all of them. Thus Fig. 8 shows an example of this arrangement for a rotary current-machine.

The use of the unipolar cells as such for the excitation of machines, as already mentioned in the introduction, is not at all claimed as novel. Similarly automatic influencing of the excitation (compounding) by means of the main current without the use of unipolar cells is not novel, because already prior to this it has been solved in various ways. The essential novelty is rather the utilization of the simplicity of unipolar cells for the excitation of a dynamo in combination with the entrusting of only a portion of the total excitation (additional excitation) to the cells, whereby the influence of the low efficiency of said cells is of less consequence.

What I claim as my invention, and desire to secure by Letters Patent, is—

1. An arrangement for diminishing the fall in potential in monophase or polyphase alternating-current machines, consisting of a source of continuous current, a circuit in connection therewith, which circuit is also in connection with the magnet-windings of the alternating-current machine, a transformer in the main circuit of the latter, and a unipolar cell in the circuit of the secondary current of the transformer which is also connected with the magnet-windings of the alternating-current machine.

2. An arrangement for diminishing the fall in potential in monophase and polyphase alternating-current machines, consisting of a source of continuous current, a circuit in connection therewith, said circuit being also in connection with one of the magnet-windings of the alternating-current machine, a transformer in the main circuit of the latter, and a unipolar cell in the circuit of the secondary current of the transformer which is also connected with the other of the magnet-windings of the alternating-current machine.

3. An arrangement for diminishing the fall in potential in monophase or polyphase alternating-current machines, consisting of a source of continuous current, a circuit in connection therewith, said circuit being also in connection with the magnet-windings of the alternating-current machine, a transformer in the main circuit of the latter, and a unipolar cell in the circuit of the secondary current of the transformer, which is connected with the magnet-windings of the said source of continuous current.

In testimony whereof I have signed my name to this specification in the presence of two subscribing witnesses.

MICHAEL VON DOLIVO-DOBROWOLSKY.

Witnesses:
   ROBERT KÜHNEL,
   ERNST HOLM.